United States Patent [19]

Staerzl

[11] Patent Number: 4,763,626
[45] Date of Patent: Aug. 16, 1988

[54] FEEDBACK FUEL METERING CONTROL SYSTEM

[75] Inventor: Richard E. Staerzl, Fond du Lac, Wis.

[73] Assignee: Brunswick Corporation, Skokie, Ill.

[21] Appl. No.: 95,356

[22] Filed: Sep. 10, 1987

Related U.S. Application Data

[63] Continuation-in-part of Ser. No. 25,270, Mar. 12, 1987.

[51] Int. Cl.$^4$ .................... F02M 7/00; F02B 33/04
[52] U.S. Cl. .................... 123/438; 123/73.A; 123/381; 73/861.02; 364/510
[58] Field of Search ............ 123/478, 487, 488, 494, 123/357, 381, 73 A, 438; 73/118.2, 119 R, 861.02, 861.03; 364/510, 558

[56] References Cited

U.S. PATENT DOCUMENTS

| | | | |
|---|---|---|---|
| 3,884,195 | 5/1975 | Murtin et al. | 123/485 |
| 3,924,975 | 12/1975 | Hundertmark | 417/395 |
| 3,933,135 | 1/1976 | Zillman et al. | 123/494 X |
| 4,010,645 | 3/1977 | Herzl | 73/861.03 |
| 4,050,878 | 9/1977 | Priegel | 123/494 X |
| 4,125,093 | 11/1978 | Platzer, Jr. | 123/494 |
| 4,131,088 | 12/1978 | Reddy | 123/494 |
| 4,216,673 | 8/1980 | November | 73/861.03 X |
| 4,244,332 | 1/1981 | Kusche et al. | 123/59 B |
| 4,250,745 | 2/1981 | Blatter et al. | 123/494 X |
| 4,264,961 | 4/1981 | Nishimura et al. | 123/494 X |
| 4,280,465 | 7/1981 | Staerzl | 123/494 |
| 4,290,394 | 9/1981 | Frank et al. | 123/73 A |
| 4,301,779 | 11/1981 | Hufton | 123/487 X |
| 4,305,351 | 12/1981 | Staerzl | 123/73 A |
| 4,349,000 | 9/1982 | Staerzl | 123/491 |
| 4,391,254 | 7/1983 | Staerzl | 123/478 |
| 4,391,255 | 7/1983 | Staerzl | 123/481 |
| 4,401,085 | 8/1983 | Staerzl | 123/488 |
| 4,407,248 | 10/1983 | Takeuchi et al. | 123/494 |
| 4,423,485 | 12/1983 | Sami et al. | 123/357 X |
| 4,429,673 | 2/1984 | Staerzl | 123/491 |
| 4,502,325 | 3/1985 | Klomp | 73/861.02 X |
| 4,523,572 | 6/1985 | Staerzl | 123/494 |
| 4,549,517 | 10/1985 | Kamiyama | 123/478 |
| 4,562,744 | 1/1986 | Hall et al. | 73/861.02 |
| 4,612,895 | 9/1986 | Kuroiwa et al. | 123/494 |
| 4,617,892 | 10/1986 | Staerzl | 123/352 |
| 4,637,261 | 1/1987 | Kraus et al. | 73/118.2 X |
| 4,644,474 | 2/1987 | Aposchanski et al. | 123/494 X |

FOREIGN PATENT DOCUMENTS 0153932  9/1984  Japan .................... 123/381

Primary Examiner—Willis R. Wolfe
Attorney, Agent, or Firm—Andrus, Sceales, Starke & Sawall

[57] ABSTRACT

A feedback fuel metering control system is provided for an internal combustion engine and eliminates the need for high pressure fuel injectors, a high pressure fuel pump and a constant fuel pressure regulator. The system senses the amount of combustion air supplied to the engine, senses fuel flow velocity, and controls the amount of fuel supplied according to the amount of combustion air the fuel flow velocity.

25 Claims, 6 Drawing Sheets

FEEDBACK FUEL METERING CONTROL SYSTEM

CROSS REFERENCE TO RELATED APPLICATION

This application is a continuation-in-part of application Ser. No. 07/025,270, filed Mar. 12, 1987 still pending.

BACKGROUND AND SUMMARY OF PARENT APPLICATION

The subject matter of my above noted parent application relates to an electronic fuel injection control system for an internal combustion engine. The system senses both the mass and flow velocity of combustion air for the engine and accordingly controls the amount of fuel injected, without determination from a preprogrammed look-up table according to throttle setting. The parent invention eliminates the need for a throttle position sensor. The use of air mass and air flow velocity is called a mass flow system.

In a fuel injected engine, it is necessary to know the amount of air going into the engine in order to determine the amount of fuel to be injected, in order to provide the proper air-fuel ratio mixture. In a speed density system, for example as shown in my prior U.S. Pat. No. 4,305,351, hereby incorporated herein by reference, the amount of air going into the engine is determined indirectly by knowing ahead of time the typical amount of air entering the engine for a given throttle setting. The fuel requirements are then programmed in a look-up table memory. This type of system works well if the engine is a constant. However, if the engine is altered, then the look-up table for the fuel requirements must be reprogrammed. This is particulary objectionable in racing applications where the engine may be changed from day to day, or race to race, by providing different compression ratios, cylinder heads, camshafts, etc. The look-up table does not self-correct or automatically track the particular engine at hand.

It is common in marine racing applications to change cylinder heads, seeking higher compression ratios. This changes the operating and horsepower characteristics of the engine, and in turn requires that the speed density system be recalibrated in order to achieve optimum performance. In addition, it has been found in racing applications that the throttle position sensor has a very short life rating. With the high stresses and shock loading typical in racing, particularly on engines running close to 10,000 rpm, it is not uncommon for throttle position sensors to fail within a half hour. It is not unusual to replace the throttle position sensor after every race.

The parent invention arose out of marine racing applications, though it is not limited thereto. The parent invention senses air flow velocity and air mass to control the amount of fuel injected, without determination from a preprogrammed look-up table according to throttle setting. The parent invention overcomes the above noted problems regarding reprogramming and recalibration upon alteration of the engine or use on different engines. The parent invention also eliminates the need for a throttle position sensor, overcoming the above noted reliability problem.

The parent invention provides a mass flow system which determines the amount of air coming into the engine by means of its velocity and mass. With this information, it is known how much fuel the engine needs. The system automatically tracks and self-adjusts to the particular engine at hand, and can be used on an altered engine or on another different engine, and will automatically readjust to the engine's fuel requirements, all without a look-up table. The automatic tracking is also desirable as the engine wears. As piston rings wear, the piston will pull in less air, and the electronic fuel injection control system wil automatically lower the amount of fuel injected. Without this automatic adjustment, the fuel-air mixture would become richer.

One manner known in the prior art for measuring air flow is to use a hot film or a hot wire. The denser the air moving by the film, the more heat will be removed from the film. Also, the faster the air moves by the film, the more heat will be removed. The amount of energy needed to maintain a constant temperature of the film is measured, to indicate the amount of heat being pulled off by the air flowing by the film. A drawback of the hot film is that it is a very fragile device. Another problem is that the film must be relatively free of contamination. If there is dirt on the film, the dirt will act as an insulator and will change the measurement. It has also been found that water in the air stream dramatically adversely affects the hot film. Water is much denser than air, and extracts more heat. In marine applications, it is nearly impossible to keep water out of the engine, and hence such system is not suitable therefor.

Another approach known in the prior art for measuring air flow is to use a flapper valve. A spring loaded valve in the air stream is deflected by the air flow, and the amount of deflection measures the air flow. The disadvantage of this approach is that the flapper valve is in the air stream and blocks some of the air, acting like a throttle and reducing maximum horsepower. It has also been found that in rough water applications, the flapper may start oscillating or may even break off because of the shock loads experienced in racing. The rugged environment of marine racing thus rules out the flapper valve approach.

In the parent invention, flow velocity of combustion air is measured by sensing air pressure drop across a venturi in the air intake manifold, and the mass of combustion air is measured by sensing air pressure and temperature.

BACKGROUND AND SUMMARY OF PRESENT INVENTION

The present invention eliminates the need for a high pressure fuel pump, high pressure fuel injector and a constant fuel pressure regulator in a fuel injection system.

In a typical fuel injection system, fuel for combustion is precisely metered by a high pressure fuel injector which is open for a given length of time, determined by an injection pulse. This in turn requires that a supply of fuel at a known pressure be provided. Hence a high pressure fuel pump is needed together with a constant fuel pressure regulator. These precision components are costly.

The present invention enables the use of a relatively inexpensive low pressure solenoid for metering the fuel. There are no expensive high pressure fuel injectors. The system uses a standard relatively low pressure fuel pump, rather than a high pressure fuel pump. Furthermore, the system does not need an expensive constant fuel pressure regulator.

BRIEF DESCIRPTION OF THE DRAWINGS

Parent Application

Present Invention

Figure 6:
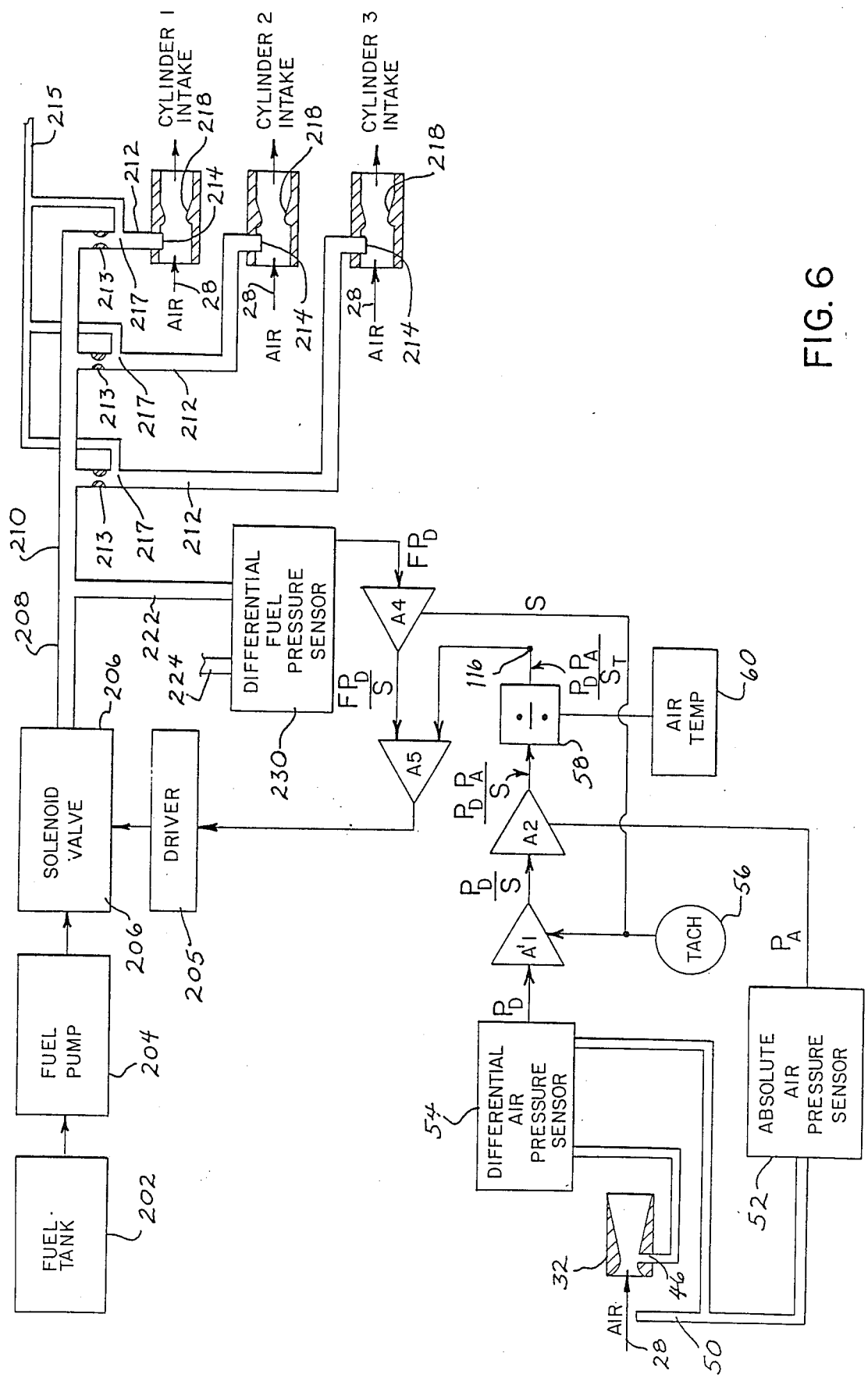

FIG. 6 is a schematic block diagram of electronic control circuitry in accordance with the present invention.

Figure 7:
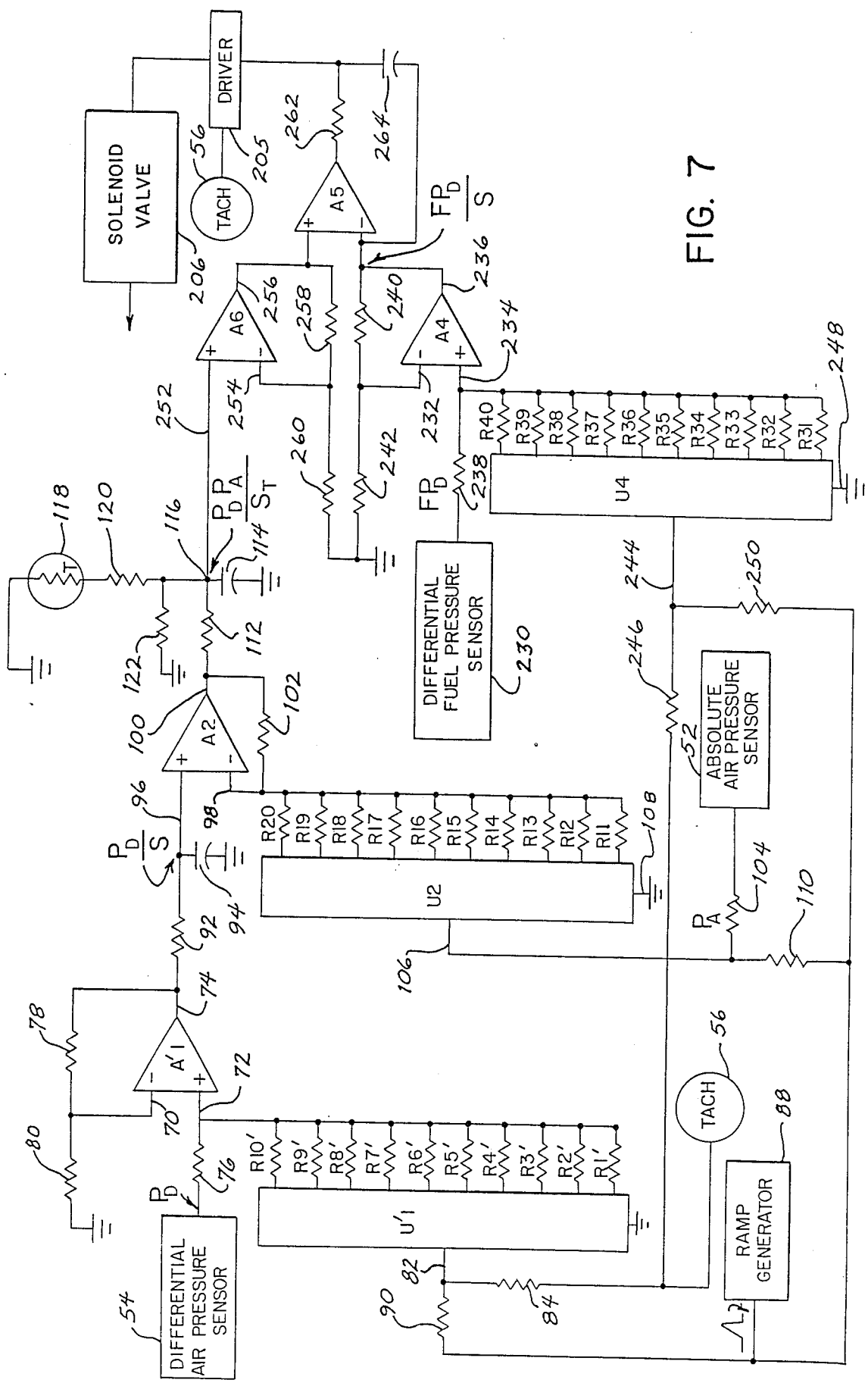

FIG. 7 is a more detailed circuit diagram of the circuitry of FIG. 6.

Figure 1:
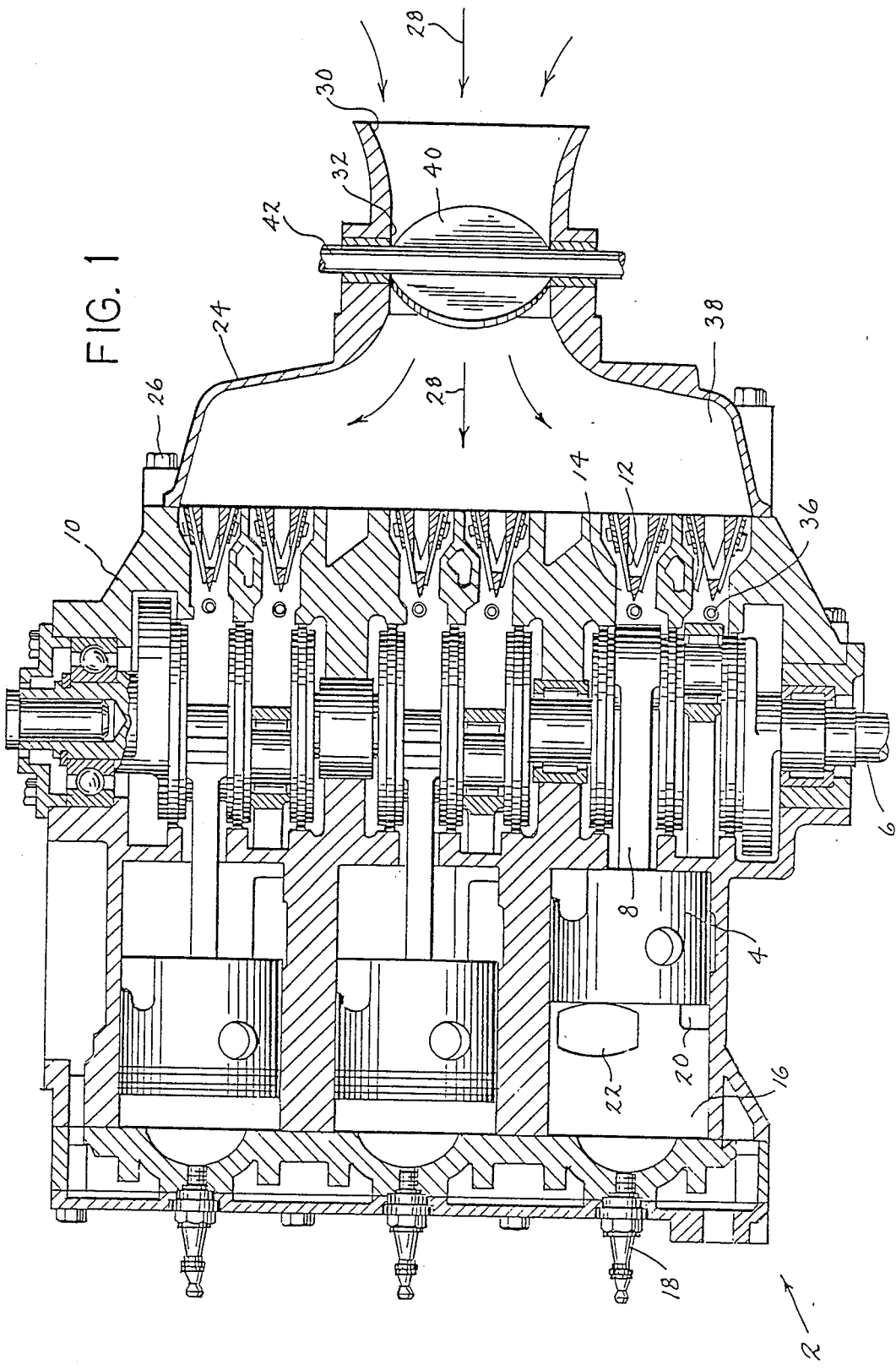
FIG. 1 is a sectional view through one of the cylinder banks of a V-6 marine internal combustion engine and control system in accordance with the invention of the above noted parent application.
Figure 8:
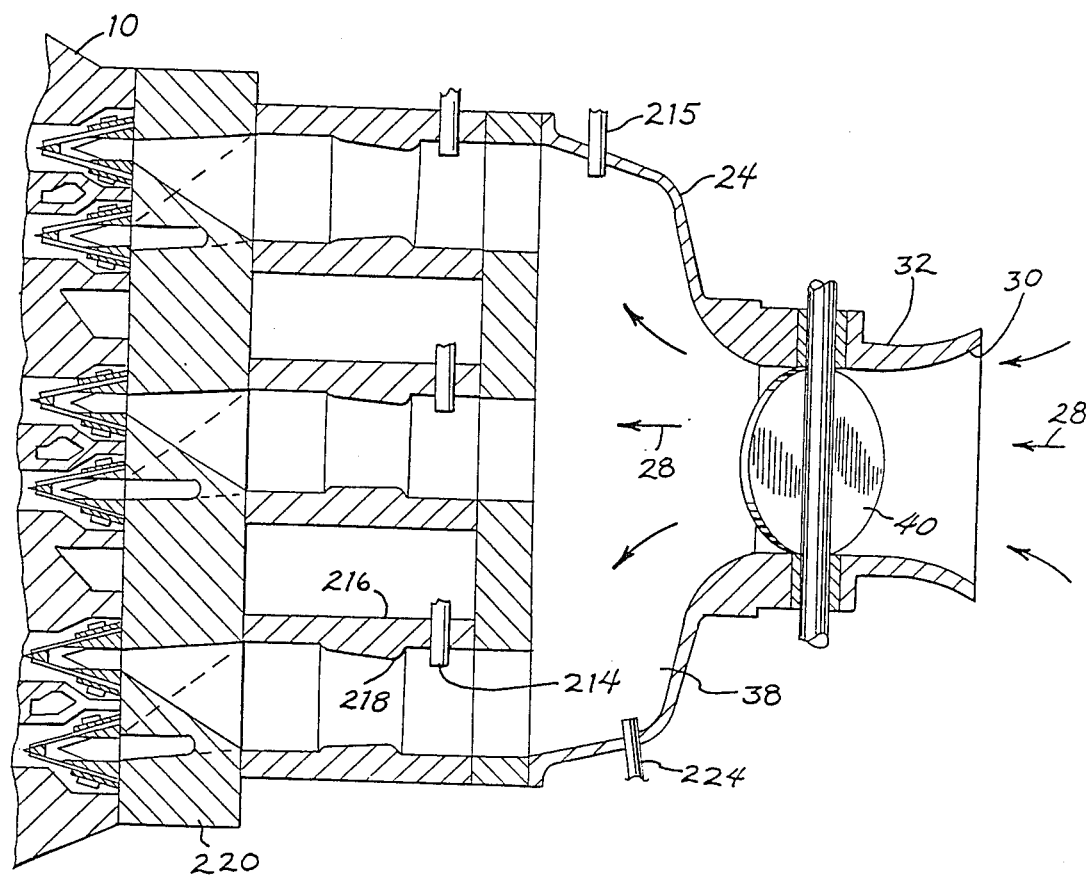

FIG. 8 is a view similar to that in FIG. 1 and shows modifications.

DETAILED DESCRIPTION

Parent Application

FIG. 1 shows a two cycle internal combustion engine 2 having a plurality of reciprocal pistons 4 connected to a vertical crankshaft 6 by connecting rods 8 in a cylinder block 10. FIG. 1 shows one bank of three cylinders in a V-6 engine. Piston 4 moves to the left during its intake stroke drawing a fuel-air mixture through one-way reed valves 12 into crankcase chamber 14. Piston movement to the left also compresses the fuel-air mixture in cylinder 16 for ignition by spark plug 18, which combustion drives piston 4 to the right generating its power stroke. During the movement of piston 4 to the right, the fuel-air mixture in crankcase chamber 14 is blocked by one-way reed valves 12 from exiting the crankcase and instead is driven through a transfer passage in the crankcase to port 20 in cylinder 16 for compression during the intake stroke, and so on to repeat the cycle, all as is well known. The combustion products are exhausted at port 22.

Figure 2:
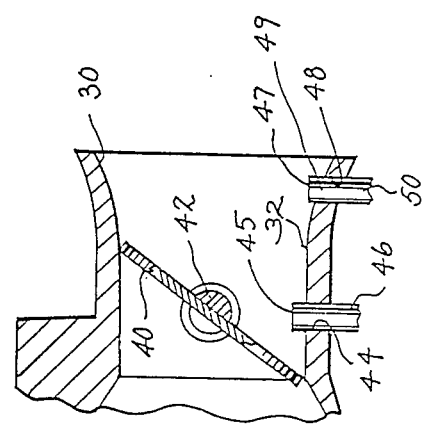
FIG. 2 is a sectional view through a portion of the structure of FIG. 1.

Air intake manifold 24 is mounted by bolts 26 to crankcase 10 and defines the air intake flow path as shown at arrows 28. The manifold includes an outer mouth 30 and a reduced inner diameter portion 32 providing a venturi through which the air flows. Fuel is injected into the crankcase downstream of the reed valves, for example as shown in incorporated U.S. Pat. No. 4,305,351 at fuel injectors 34 in FIGS. 2 and 3. The fuel injector tips are shown at 36. Alternatively, the fuel may be injected in plenum 38 upstream of the reed valves. Venturi 32 includes a butterfly valve 40 on rotatable shaft 42 for controlling air flow into manifold 24. Manifold 24 has a drilled passage 44 therethrough, FIG. 2, at venturi 32 which receives a tube 46 for sensing pressure at venturi 32. Manifold 24 has another drilled passage 48 therethrough at outer mouth 30 which receives a tube 50 for sensing pressure thereat. As air flows through venturi 32, there is a pressure drop according to Bernoulli's principle. Tube 46 is open at its end 45 and senses the reduced pressure in venturi 32. Tube 50 senses the absolute pressure outside of the venturi. Tube 50 is closed at its end 47 and has a small hole in its side 49 facing upstream. When butterfly valve 40 is closed, it is at an angle of approximately 30° relative to a plane normal to air flow path 28. Tube 46 is adjacent shaft 42 and upstream of valve 40.

Figure 3:
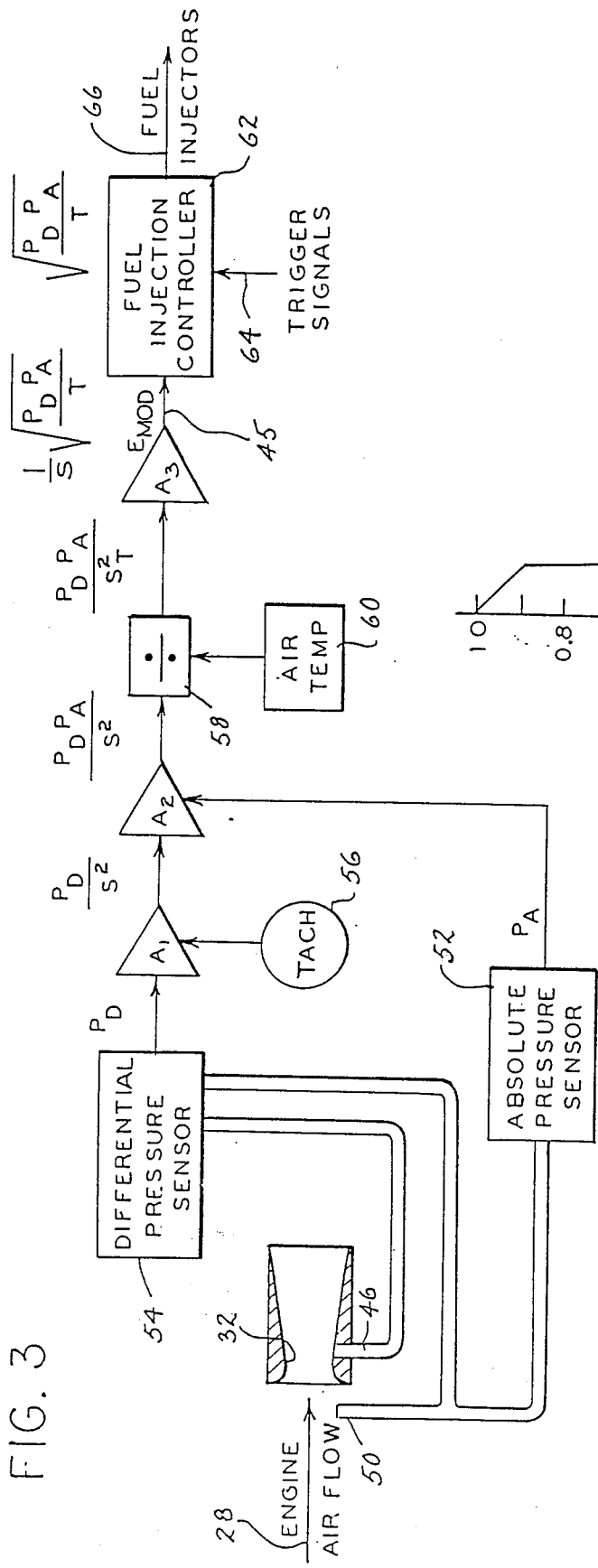
FIG. 3 is a schematic block diagram of electronic control circuitry in accordance with the invention of the parent application.

As noted, venturi 32 in air intake manifold 24 produces a pressure drop. Absolute pressure sensor 52, FIG. 3, for example a Microswitch 136PC, measures absolute air pressure $P_A$ outside of venturi 32 at tube 50. Differential pressure sensor 54, for example a Microswitch 176PC, measures the differential pressure $P_D$ between the absolute pressure outside of the venturi at tube 50 and the reduced pressure in the venturi at tube 46. Engine speed S measured by tachometer 56 is squared by amplifier A1 and also divided by amplifier A1 into $P_D$, and the result is multiplied by $P_A$ at amplifier A2, which result is divided at 58 by air temperature T from temperature sensor 60. Amplifier A3 performs a square root function whose output is the signal $E_{MOD}$ on line 45 in FIG. 11 of incorporated U.S. Pat. No. 4,305,351. The signal $E_{MOD}$ is supplied to the fuel injection controller 62 provided by the one or more square wave pulse generators in FIG. 11 of incorporated U.S. Pat. No. 4,305,351, which are triggered by one or more ignition pulses shown as FIRE CYL. #1 and FIRE CYL. #4 in FIG. 11 of incorporated U.S. Pat. No. 4,305,351. These ignition pulses provide the trigger signals on line 64, FIG. 3, to the fuel injection controller which in turn outputs injection pulses on line 66 to the fuel injectors, as shown at the one or more lines 48, 49 in FIG. 11 of incorporated U.S. Pat. No. 4,305,351. The length of the injection pulses on line 66, FIG. 3, is determined by $$\sqrt{\frac{P_D P_A}{T}} \cdot \sqrt{P_D}$$

measures air flow velocity. $\sqrt{P_A/T}$ measures air mass. The frequency of the ignition or trigger signals on line 64 corresponds to engine speed and hence cancels Out the factor 1/S in the $E_{MOD}$ signal.

The differential pressure $P_D$ varies over a wide range, from a minimum at idle speed to a maximum at high engine speed. The low end signal may be too small for the amplifier unless an inordinate amount of gain is provided. On the other hand, the high end signal may saturate the amplifier unless the gain is reduced. These factors limit the dynamic range. One solution is to provide a greater pressure drop by further reducing the constriction of the venturi. However, it is not desirable to reduce the constriction of the venturi too much because this would hinder air flow and reduce power, etc. In the preferred embodiment, the inner diameter at mouth 30 is about five inches and the inner diameter at venturi 32 is about three inches. The dynamic range dilemma is solved by reducing the differential pressure signal as engine speed increases. The amplifier can thus be provided with enough gain to amplify the low end signals at idle speed, and yet not saturate at high speed. $P_D$ is reduced by a factor of $S^2$.

Figure 4:
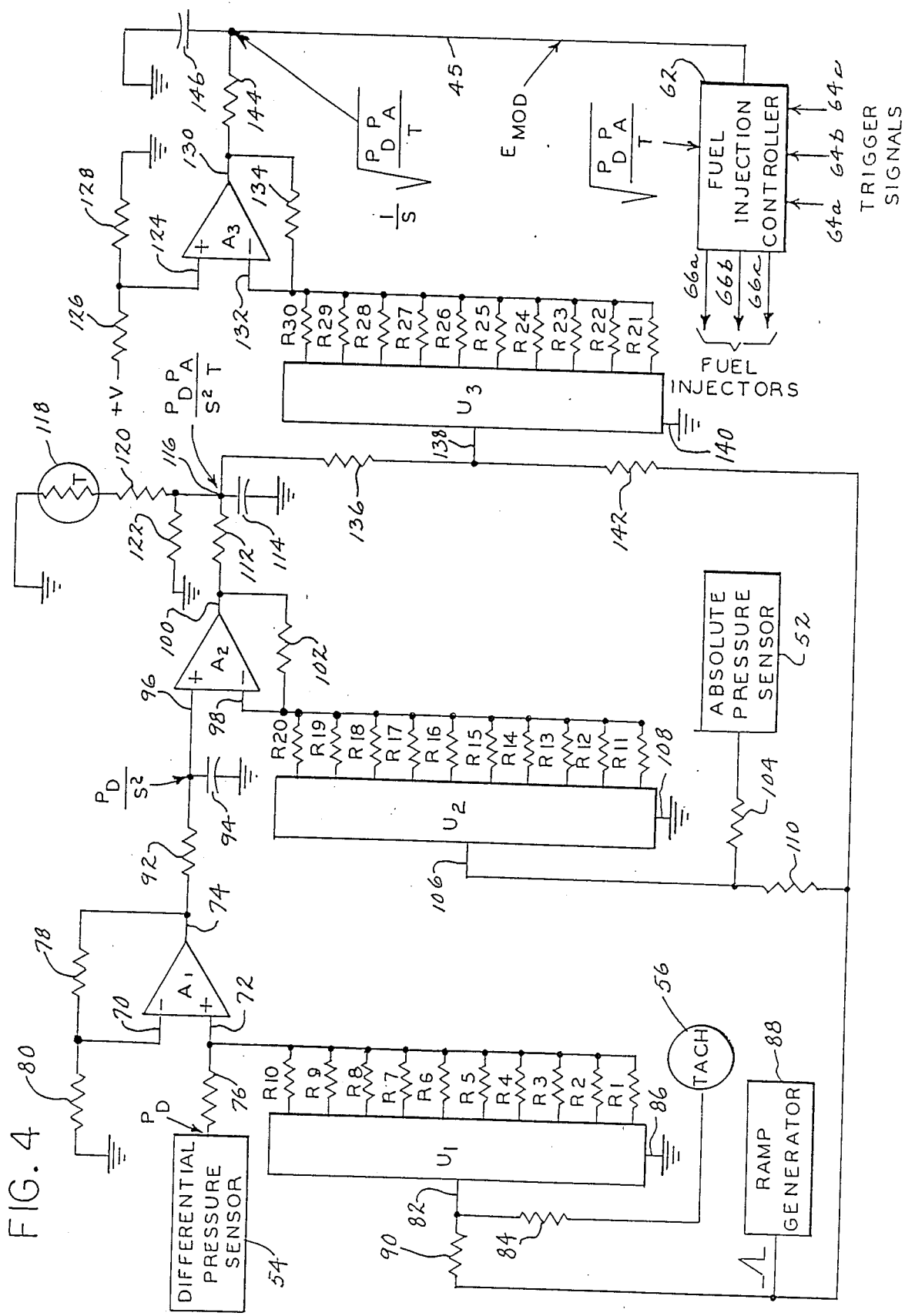
FIG. 4 is a more detailed circuit diagram of the circuitry of FIG. 3.

Referring to FIG. 4, amplifier A1 has an inverting input 70, a noninverting input 72 and an output 74. The output of differential pressure sensor 54 is connected through resistor 76 to input 72 of amplifier A1. The output 74 of amplifier A1 is connected in a voltage divider network formed by resistors 78 and 80 in a feedback loop to input 70 to set the gain of amplifier A1.

An LED chip driver U1, for example an LM3914, has an input 82 from tachometer 56 through resistor 84, and has a plurality of outputs including respective resistors R1–R10 connected in parallel to input 72 of amplifier A1. As engine speed increases, the voltage at U1 input 82 from tachometer 56 increases, which in turn sequentially turns on resistors R1 through R10 in stepwise manner. When the first output turns on, resistor R1 is connected in circuit with amplifier input 72 such that current flows from input 72 through resistor R1 to ground reference at 86. This sinking of current through resistor R1 from input 72 lowers the voltage at input 72 which in turn reduces the voltage at amplifier output 74 because less gain is needed to keep the voltage at input 70 equal to that at input 72. As engine speed continues to increase, the voltage at U1 input 82 increases, and when it reaches the next threshold, the output at R2 is turned on to also connect resistor R2 in circuit with amplifier input 72 such that additional current flows from input 72 through resistor R2 to ground reference at 86, thus further lowering the voltage at amplifier input 72 and hence lowering the voltage at amplifier output 74. As engine speed continues to increase, the voltage at input 82 increases, and the remaining resistors R3 through R10 are sequentially turned on.

Figure 5:
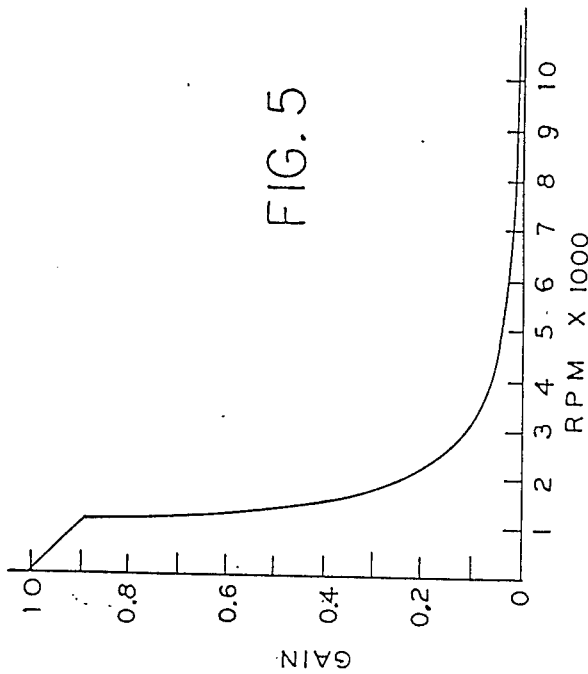
FIG. 5 is a graph illustrating operation of a portion of the circuitry of FIG. 4.

The values of resistances R1 through R10 are chosen to provide the noted quadradic squaring and division function to yield $P_D/S^2$. In FIG. 4, the resistance values for resistors R1–R10 are, respectively: 909 K ohms; 30.1 K ohms; 17.8 K ohms; 12.7 K ohms; 10.0 K ohms; 8.06 K ohms; 6.81 K ohms; 5.90 K ohms; 5.23 K ohms; and 4.64 K ohms. FIG. 5 shows a graph of relative gain of amplifier A1 for the output signal at 74 versus engine speed, and illustrates the decreasing quadradic relationship with increasing engine speed. The smooth nature of the curve is facilitated by ramp generator 88 providing a superimposed ramp voltage through resistor 90 to U1 input 82 which periodically rises to a maximum voltage level about 1/10th that of the maximum tachometer voltage. Ramp generator 88 is an RC oscillator running at a substantially higher frequency, e.g. 100 hertz, than the progression of threshold steps of U1, i.e. the ramp generator will go through many cycles between each of the threshold steps for turning on R1 through R10. The superimposed oscillatory higher frequency ramp voltage provides a small ripple in the voltage at input 82 which provides a more gradual turning-on of the next threshold step, rather than an abrupt turn-on of the next resistance, and hence smooths out the otherwise stepwise incrementation of voltage at amplifier input 72, and provides a more smoothly varying variable resistance attenuator. Resistor 92 and capacitor 94 provide an RC filter filtering out the ramp generator frequency at the output of amplifier A1.

Amplifier A2 has a noninverting input 96 receiving the signal $P_D/S^2$, an inverting input 98 and an output 100. Output 100 is connected to input 98 in a feedback loop including a voltage divider network formed by resistor 102 and parallel resistors R11–R20 in the outputs of LED chip driver U2, such as an LM3914. Absolute pressure sensor 52 is connected through resistor 104 to U2 input 106. As the absolute air pressure increases, the increasing voltage at U2 input 106 sequentially turns on resistors R11–R20 in stepwise manner as the various switching thresholds are reached. As more outputs of U2 are turned on, more resistors are connected in parallel between amplifier input 98 and ground reference 108, which in turn sinks more current through the respective resistors from amplifier input 98, thus lowering the voltage at input 98. The lower voltage at amplifier input 98 causes the voltage at amplifier output 108 to increase because such increased gain is necessary to maintain the voltage at input 98 equal to that at amplifier input 96.

The values of resistances R11–R20 are chosen to provide a linear multiplying function, in order to multiply $P_D/S^2$ by $P_A$. Resistors R11–R20 each have the same resistance, 100 K ohms. The voltage from ramp generator 88 is applied through resistor 110 to be superimposed and added to the voltage at U2 input 106 smooth out the stepwise changing of resistance at the outputs of U2, in order to provide a smoother change. The ramp generator frequency is later filtered out at the RC filter provided by resistor 112 and capacitor 114 at the output of amplifier A2.

The divider function 58 of FIG. 3 is provided at node 116 in FIG. 4. Temperature sensor 60 is a negative temperature coefficient thermistor 118 connected between node 116 and ground reference, and physically located at inlet mouth 30 to sense ambient air temperature. A resistor 120 is connected in series between node 116 and NTC thermistor 118, and a resistor 122 is connected in parallel with NTC thermistor 118 between node 116 and ground reference. As temperature increases, the resistance of NTC thermistor 118 decreases, and more current is conducted therethrough from node 116, which in turn lowers the voltage at node 116, providing the divide by T function. Resistor 120 has a substantially lower resistance value than resistor 122. At low temperature, the resistance value of thermistor 118 is high, and most of the current from node 116 flows through resistor 122. At high temperature, the resistance valve of thermistor 118 is low, and most of the current from node 116 flows through resistor 120 and thermistor 118, because such branch provides the lower resistance path at high temperature. Resistors 122 and 120 have a ratio of about a 100 to 1 and tend to linearize the response of thermistor 118, to provide a more linear divide by T function, such that the output voltage from amplifier A2 is more linearly reduced with increasing temperature.

Amplifier A3 has a noninverting input 124 connected to a voltage source +V through a voltage divider network formed by resistors 126 and 128. Amplifier A3 has an output 130 connected to noninverting input 132 in a feedback loop including the voltage divider network formed by resistor 134 and resistors R21–R30 which are connected to respective parallel outputs of LED chip driver U3, such as an LM3914. The voltage at node 116, representing $P_D P_A/S^2$, is supplied through resistor 136 to the input 138 of U3. As the voltage at input 138 increases, the outputs of U3 are sequentially turned on in stepwise manner, to connect more resistors to amplifier input 132, to in turn sink more current through the respective parallel resistors from amplifier input 132 to ground reference 140, to lower the voltage at amplifier input 132. The lower voltage at amplifier input 132 causes an increased voltage at amplifier output 130 because more gain is needed to keep the voltage at input 132 equal to that at input 124.

The values of resistances R21–R30 are chosen to provide the square root function and are respectively 383 K ohms; 191 K ohms; 249 K ohms; 294 K ohms; 332 K ohms; 374 K ohms; 402 K ohms; 432 K ohms; 475 K ohms; and 487 K ohm. Oscillatory ramp voltage from ramp generator 88 through resistor 142 is superimposed and added at input 138 to smooth out the step changes as the switching thresholds are reached for turn-on of the outputs having resistors R21 through R30. The ramp voltage frequency is later filtered out by the RC filter formed by resistor 144 and capacitor 146.

The output of amplifier A3 provides the $E_{MOD}$ signal on line 45 which is the $E_{MOD}$ signal on line 45 in FIG. 11 of incorporated U.S. Pat. No. 4,305,351. FIG. 11 of incorporated U.S. Pat. No. 4,305,351 shows two square wave pulse generators 46 and 47 in accordance with the timing system in FIG. 5 thereof. In the parent invention, the timing system in FIG. 6 of incorporated U.S. Pat. No. 4,305,351 is preferred, with three square wave pulse generators each of which is supplied with the $E_{MOD}$ signal, and each of which receives its respective injection trigger signal 64a, 64b, 64c provided by the respective ignition pulses indicated as FIRE #1, FIRE #3 and FIRE #5 in FIG. 6 of incorporated U.S. Pat. No. 4,305,351. Likewise, instead of two output injection pulses shown as 48 and 49 in FIG. 11 of incorporated U.S. Pat. No. 4,305,351, the parent system includes three output injection pulses 66a, 66b, 66c respectively providing INJECT #3, 4, INJECT #5, 6, INJECT #1, 2 in FIG. 6 of incorporated U.S. Pat. No. 4,305,351. The frequency of the ignition trigger pulses corresponds to engine speed and hence cancels the term 1/S in the $E_{MOD}$ signal. The square wave generators are triggered by the ignition trigger signals, and the length of the injection pulses output therefrom equals k $\sqrt{P_D P_A/T}$, where k is a constant.

The square root generator function provided by A3 and U3 includes a failsafe region in the event differential pressure sensor 54 fails or the voltage at U3 input 138 drops to zero. Even with a zero input at 118, it is still desired that a certain level voltage output be generated at the amplifier output on line 45 so that there will be at least some fuel injection pulse length generated in order to inject enough fuel to keep the engine running and at least get home, albeit not at peak power. This minimum fuel supply is considered desirable and provides a limp home feature so that the boat operator will not be stranded in the middle of the lake. Amplifier A3 is thus preferably provided with a minimum gain even if each of the U3 outputs through respective resistors R21-R30 is nonconductive, which gain is set by resistor 114. Because of this gain, the value of resistance R21 is selected out of sequence with the other resistances R22-R30, as above noted.

The parent invention is preferably implemented in analog circuitry, as disclosed above, though it can also be implemented by digital circuitry including a microprocessor. Analog circuitry is preferred because of its better noise immunity. For example, an ignition spike in an analog system may cause a momentary purturbation, but the system will keep running. In a digital system, such ignition spike may fill or lock-up a register such that the next component gets the wrong operational code, and the system may shut down. Marine racing applications involve high speeds and extremely noisy environments, and hence the analog circuitry is desirable. If digital or microprocessor circuitry is used, it is still preferred that the interfacing of the differential pressure sensor be done after the sensor's analog output is reduced with increasing engine speed, to improve the sensor's dynamic range.

It is thus seen that a mass flow fuel injection control system is provided for an internal combustion engine having air intake means supplying combustion air to the engine, and fuel injector means supplying fuel to the engine. Flow velocity of the combustion air is determined by measuring $P_D$ and calculating $\sqrt{P_D}$. Air mass is determined by measuring $P_A$ and T and calculating $\sqrt{P_A/T}$. The circuitry responds to the measured values $P_D$, $P_A$ and T to control the amount of fuel injected according to air flow velocity and air mass as calculated by $\sqrt{P_D P_A/T}$.

Present Invention

FIGS. 6–8 use like reference characters from FIGS. 1–5 where appropriate to facilitate clarity. Amplifier A1' in FIGS. 6 and 7 performs a divide by S function, rather than the divide by $S^2$ function of FIGS. 3 and 4. The values of resistances R1'-R10' are chosen to provide the linear dividing function, in order to divide $P_D$ by S. Resistors R1'-R10' each have the same resistance, 100 K ohms. Dividing $P_D$ by S increases dynamic range. $P_D$ can be divided by other powers of S; the higher the power, the greater the dynamic range. Amplifier A2 performs the same linear multiplying function as in FIGS. 3 and 4, in order to multiply $P_D/S$ by $P_A$. The divider function 58 is provided at node 116, as in FIGS. 3 and 4. The square root function of FIGS. 3 and 4 is not performed in FIGS. 6 and 7.

Referring to FIG. 6, fuel is supplied from fuel tank 202 by a standard low pressure fuel pump 204, operated by pressure changes in the crankcase, for example *Outboard Service Training Notebook*, Brunswick Corp. Bulletin 90-90592 2-985, pages 10-11, Mariner fuel pumps, and for example as shown in U.S. Pat. No. 3,924,975, incorporated herein by reference. The amount of fuel supplied to the engine is controlled by a solenoid valve 206, for example a Brunswick Corp. Mercury Marine Part No. 43739 solenoid valve. The fuel is metered by the solenoid into a fuel line 208 supplying fuel to fuel rail 210 which feeds each of the cylinders through respective parallel passages 212. Each pasage 212 has a delivery outlet 214 delivering fuel to an atomizer venturi 216 upstream of the restrictive portion 218 of the venturi. There are no high pressure fuel injectors in any of passages 212. Venturi 216, FIG. 8, receives air at 28 from plenum 38 of intake manifold 24, and atomizes the fuel from outlet 214 and delivers the fuel/air mixture to the respective cylinder. Venturis 216 are mounted by adapter plate 220 to the crankcase, as shown in U.S. Pat. No. 4,244,332, incorporated by reference.

Each passage 212 has an orifice 213 of a restricted diameter opening for metering fuel flow therethrough, and to produce a fuel pressure drop thereacross according to Bernoulli's principle. The fuel pressure drop indicates fuel flow velocity. Tube 222 senses fuel pressure upstream of restriction orifice 213 at fuel line 208. Tube 224 senses the pressure downstream of restriction orifice 213 at outlet 214 by sensing the pressure in plenum 38 of manifold 24 which is at substantially the same pressure as outlet 214.

In a marine outboard engine, the cylinders are vertically aligned. In a V-shaped design, each bank of cylinders is vertically aligned. Orifices 213 are higher than the highest of outlets 214. The low pressure downstream of orifices 213 may not be sufficient to push the fuel uphill, and hence the gravity type feed is desired as provided by orifices 213 higher than outlets 214. An air line 215 is connected between plenum 38 and a bleed hole 217 in each of passages 212. It has been found that this air line prevents siphoning of fuel which may otherwise occur because the cylinders are at different heights. Air line 215 also ensures that the downstream side of orifices 213 are at the same pressure as plenum 38.

Differential fuel pressure sensor 230, for example a microswitch 176 PC, measures the differential pressure $FP_D$ across orifice 213, i.e. the pressure upstream of orifice 213 at tube 222 and the pressure downstream of orifice 213 at outlet 214 and tube 224. Amplifier A4 divides $FP_D$ by engine speed S to yield $FP_D/S$. Amplifier A5 compares $FP_D/S$ to $P_D P_A/ST$ and controls solenoid 206 to supply more or less fuel according to the amount of combustion air as represented by $P_D P_A/ST$ and the fuel flow velocity as represented by $FP_D/S$. The divide by S function is preferred because it increases dynamic range of the system, as above, though it can be deleted. Other powers of S can be used as the dividend.

Amplifier A4 has an inverting input 232, FIG. 7, a noninverting input 234 and an output 236. The output of differential fuel pressure sensor 230 is connected through resistor 238 to input 234 of amplifier A4. The output 236 of amplifier A4 is connected in a voltage divider network formed by resistors 240 and 242 in a feedback loop to input 232 to set the gain of amplifier A4. An LED chip driver U4, for an example an LM3914, has an input 244 from tachometer 56 through resistor 246, and has a plurality of outputs R31-R40 connected in parallel to input 234 of amplifier A4.

As engine speed increases, the voltage at U4 input 244 from tachometer 56 increases, which in turn sequentially turns on resistors R31 through R40 in stepwise manner. When the first output turns on, resistor R31 is connected in circuit with amplifier input 234 such that current flows from input 234 through resistor R31 to ground reference at 248. This sinking of current through resistor R31 from input 234 lowers the voltage at input 234 which in turn reduces the voltage at amplifier output 236 because less gain is needed to keep the voltage at input 232 equal to that at input 234. As engine speed continues to increase, the voltage at U4 input 244 increases, and when it reaches the next threshold, the output at R32 is turned on, to also connect resistor R32 in circuit with amplifier input 234 such that additional current flows from input 234 through resistor R32 to ground reference at 248, thus further lowering the voltage at amplifier input 234 and hence lowering the voltage at amplifier output 236. As engine speed continues to increase, the voltage at input 244 increases, and the remaining resistors R33 through R40 are sequentially turned on. The values of resistances R31 through R40 are chosen to provide a linear dividing function, in order to divide $FP_D$ by S. Chip driver U4 thus functions like chip driver U1'. Resistors R31 through R40 each have the same resistance, 100 K ohms. The voltage from ramp generator 88 is applied through resistor 250 to be superimposed and added to the voltage at U4 input 244 to smooth out the stepwise changing of resistance at the outputs of U4, in order to provide a smoother change, as above.

The output at node 116 representing $P_D P_A/ST$ is multiplied by a given constant as needed to facilitate comparison against the output of amplifier A4 representing $FP_D/S$. A desired constant is provided by amplifier A6 having a noninverting input 252 connected to node 116, an inverting input 254, and an output 256 connected in a voltage divider network formed by resistors 258 and 260 in a feedback loop to input 254 to set the gain of amplifier A6 and hence the desired constant.

Amplifier A5 is a comparator and compares $P_D P_A/ST$ to $FP_D/S$. Either or both factors may be multiplied by suitable constants to facilitate comparison. The output of amplifier A5 includes an RC filter provided by resistor 262 and capacitor 264 for filtering out the ramp frequency of generator 88. The output of amplifier comparator A5 is connected to solenoid valve 206 to control the amount of fuel supplied according to combustion air and fuel flow velocity. In one embodiment, solenoid valve 206 is driven by a variable duty cycle oscillator 205, the frequency of which is a function of engine speed S as output by tachometer 56 and the duty cycle of which is a function of the output of comparator A5.

The present invention may be used in combination with the subject matter of the noted parent application which utilizes a mass flow system for sensing the amount of combustion air supplied to the engine, or the present invention may be used with other systems sensing or determining the amount of combustion air supplied to the engine. The present invention provides a system which responds both to the amount of combustion air and to the fuel flow velocity, and controls the fuel supply means, to control the amount of fuel supplied according to combustion air and fuel flow velocity. Orifice 213 is between the fuel supply and the engine, and produces a fuel pressure drop indicating fuel flow velocity which is fed back to solenoid valve 206 controlling fuel flow to outlet 214. The invention provides a feedback fuel metering control system without a high pressure fuel pump, without high pressure fuel injectors and without a constant fuel pressure regulator.

It is recognized that various equivalents, alternatives and modifications are possible within the scope of the appended claims.

I claim:

1. A feedback fuel metering control system for an internal combustion engine having air intake means supplying combustion air to said engine, and fuel supply means including a fuel pump supplying fuel to said engine, comprising:
    means sensing the amount of combustion air supplied to said engine;
    means sensing the flow velocity of fuel supplied to said engine comprising means between said fuel supply means and said engine and producing a fuel pressure drop indicating fuel flow velocity;
    means between said fuel supply means and said engine and responsive to said means sensing said amount of of combustion air and said means sensing said flow velocity of fuel and controlling fuel flow without a carburetor, to control the amount of fuel supplied to said engine according to said combustion air and said fuel flow velocity.

2. The invention according to claim 1 wherein said fuel pump is a low pressure fuel pump, and said means controlling fuel flow meters pumped fuel from said fuel pump directly into a fuel line connected to said means producing said fuel pressure drop, without a high pressure fuel pump, without high pressure fuel injectors, and without a constant fuel pressure regulator.

3. The invention according to claim 2 wherein said means sensing fuel flow velocity further comprises first pressure sensor means between said fuel supply means and said means producing said fuel pressure drop and sensing fuel pressure upstream of said means producing said fuel pressure drop, and second pressure sensor means sensing pressure downstream of said means producing said fuel pressure drop.

4. The invention according to claim 3 comprising differential pressure sensor means measuring the differential pressure between said first and second sensor means, and wherein said means controlling said fuel flow comprises a solenoid valve controlling fuel flow to said means producing said fuel pressure drop, and comparator means comparing said differential pressure and said amount of combustion air and controlling said solenoid valve.

5. A feedback fuel metering control system for an internal combustion engine having air intake means supplying combustion air to said engine, and fuel supply means supplying fuel to said engine, comprising:
   means sensing the amount of combustion air supplied to said engine;
   means between said fuel supply means and said engine and producing a fuel pressure drop;
   differential fuel pressure sensor means measuring the differential fuel pressure, $FP_D$, across said means producing said fuel pressure drop;
   solenoid valve means between said fuel supply means and said means producing said fuel pressure drop and controlling the amount of fuel supplied to said last mentioned means, to control the amount of fuel supplied to said engine,
   wherein said differential fuel pressure varies from a low value at idle speed of said engine to a high value at top speed of said engine, and comprising amplifier means responsive to said differential fuel pressure sensor means and yielding an amplifier $FP_D$ output, and means for increasing the dynamic range of said control system by preventing saturation of said amplifier means over the range of said fuel pressure differential by reducing said amplified $FP_D$ output with increasing engine speed.

6. The invention according to claim 5 comprising tachometer means for measuring engine speed, S, and wherein said amplifier means divides fuel pressure differential $FP_D$ by a given power of engine speed S.

7. The invention according to claim 6 comprising chip driver means having a plurality of outputs connected in parallel to said amplifier means, each output having a given resistance, said chip driver means having an input responsive to said tachometer means to successively turn on more of said outputs with increasing engine speed to in turn connect more of said resistances in circuit with said amplifier means, wherein the values of said resistances are selected to provide an output of said amplifier means as a decreasing function of engine speed to provide the function $FP_D/S^x$, where X is a given power of S.

8. The invention according to claim 7 wherein said amplifier means has first and second inputs and an output, and wherein the output of said differential fuel pressure sensor means and the parallel outputs including said resistances of said chip driver means are connected to one of said inputs of said amplifier means.

9. The invention according to claim 8 wherein said output of said amplifier means is connected in a voltage divider feedback network to the other of said inputs of said amplifier means to set the gain of said amplifier means, and wherein said chip driver means turns on said outputs according to given threshold speeds from said tachometer means, wherein a turned-on output of said chip driver means completes a circuit through its respective resistance means from said one input of said amplifier means to a given ground reference, such that current flows from said one input of said amplifier means through said respective resistance means to said ground reference to reduce the voltage at said one input of said amplifier means, because less gain of said amplifier means is needed to keep the voltage at said other input of said amplifier means equal to that at said one input of said amplifier means.

10. The invention according to claim 9 comprising ramp generator means supplying a periodic ramp voltage at said input of said chip driver means at a given frequency to smooth the transitions of the switching of said chip driver means outputs and provide a more gradual transitioning between said resistances and in turn a smoother reduction of the voltage level at said output of said amplifier means with increasing engine speed.

11. A feedback fuel metering control system for an internal combustion engine having air intake means supplying combustion air to said engine, and fuel supply means supplying fuel to said engine, comprising means sensing the flow velocity of fuel supplied to said engine comprising fuel passage means having an outlet in said air intake means and having a restriction orifice producing a fuel pressure drop, differential fuel pressure sensor means measuring the differential fuel pressure across said orifice indicating fuel flow velocity, and means feeding back said indicated fuel flow velocity to said fuel supply means to control the amount of fuel supplied, wherein said air intake means includes an air venturi with a restricted portion supplying combustion air to said engine, and wherein said fuel outlet is upstream of said restricted portion of said air venturi.

12. The invention according to claim 11 wherein said air intake means includes a plenum upstream of said air venturi, and comprising an air line connected between said plenum and a bleed hole in said fuel passage means downstream of said restriction orifice, said air line preventing siphoning of fuel and ensuring that the downstream side of said restriction orifice in said fuel passage means is at substantially the same pressure as said plenum.

13. A feedback fuel metering control system for an internal combustion engine having air intake means supplying combustion air to said engine, and fuel supply means supplying fuel to said engine, comprising:
   means sensing the amount of combustion air supplied to said engine comprising a first venturi supplying combustion air to said engine and producing an air pressure drop indicating air flow velocity;
   means sensing the flow velocity of fuel supplied to said engine comprising fuel passage means having an outlet in said air intake means downstream of said first venturi means and having a restriction orifice producing a fuel pressure drop indicating fuel flow velocity;
   said intake means including a second venturi downstream of said fuel outlet and supplying combustion air from said first venturi and atomized fuel from said fuel outlet to said engine;
   means responsive to said means sensing said amount of combustion air and to said means sensing fuel flow velocity and controlling said fuel supply means to control the amount of fuel supplied according to said combustion air and said fuel flow velocity.

14. The invention according to claim 13 comprising differential fuel pressure sensor means measuring the differential fuel pressure across said restriction orifice indicating fuel flow velocity, and means feeding back said indicated fuel flow velocity to said fuel supply means.

15. The invention according to claim 14 wherein said fuel supply means includes a solenoid valve controlling fuel flow to said fuel outlet between said first and second venturis.

16. A feedback fuel metering control system for an internal combustion engine having air intake means supplying combustion air to said engine, and fuel supply means supplying fuel to said engine, comprising:
 means sensing the amount of combustion air supplied to said engine;
 fuel flow velocity sensing means between said fuel supply means and said engine and comprising means producing a fuel pressure drop, and means measuring the differential fuel pressure across said means producing said fuel pressure drop;
 tachometer means for measuring engine speed;
 means for dividing said fuel pressure differential by engine speed;
 means responsive to said fuel pressure differential divided by said engine speed and to said amount of combustion air and controlling said fuel supply means.

17. The invention according to claim 16 wherein said means for sensing said amount of combustion air comprises:
 air flow velocity sensing means comprising venturi means in said air intake means producing an air pressure drop, and means measuring the differential air pressure between the absolute air pressure outside of said venturi means and the reduced air pressure in said venturi means;
 means dividing said differential air pressure by a given power of engine speed;
 means multiplying said differential air pressure by said absolute air pressure;
 means dividing said differential air pressure by air temperature.

18. The invention according to claim 17 wherein said means controlling said fuel supply means comprises a comparator comparing differential fuel pressure divided by a given power of engine speed against differential air pressure divided by a given power of engine speed and multiplied by said absolute air pressure and divided by said air temperature.

19. A mass flow feedback fuel metering control system for an internal combustion engine having air intake means supplying combustion air to said engine, and fuel supply means supplying fuel to said engine, comprising:
 means including venturi means sensing the flow velocity of said combustion air;
 means sensing the mass of said combustion air;
 means sensing the flow velocity of said fuel;
 means responsive to said last three mentioned means and controlling said fuel supply means to control the amount of fuel supplied according to said air flow velocity, said air mass said said fuel flow velocity;
 wherein:
 said venturi means is in said air intake means and produces an air pressure drop;
 said means sensing air flow velocity comprises differential air pressure sensor means measuring the differential air pressure between the absolute air pressure outside of said venturi means and the reduced air pressure in said venturi means;
 said means sensing air mass comprises temperature sensor means measuring air temperature, and absolute air pressure sensor means measuring absolute air pressure outside of said first venturi means;
 said means sensing fuel flow velocity is between said fuel supply means and said engine and comprises means producing a fuel pressure drop;
 said means sensing fuel flow velocity further comprises differential pressure sensor means measuring the differential fuel pressure across said means producing said fuel pressure drop;
 said means controlling said fuel supply means responds to said differential air pressure, said air temperature, said absolute air pressure and said differential fuel pressure, without input from a throttle position sensor and without a constant fuel pressure regulator.

20. A mass flow feedback fuel metering control system for an internal combustion engine having air intake means supplying combustion air to said engine, and fuel supply means supplying fuel to said engine, comprising:
 venturi means in said air intake means and producing an air pressure drop;
 absolute air pressure sensor means measuring absolute air pressure $P_A$ outside of said first venturi means;
 differential air pressure sensor means measuring the differential air pressure $P_D$ between the absolute air pressure outside of said venturi means and the reduced air pressure in said venturi means;
 temperature sensor means measuring air temperature $T$;
 tachometer means measuring engine speed $S$;
 divider means dividing $P_D$ by $S$;
 multiplier means multiplying $P_D/S$ by $P_A$;
 divider means dividing $P_D P_A/S$ by $T$;
 means between said fuel supply means and said engine and producing a fuel pressure drop;
 differential fuel pressure sensor means measuring differential fuel pressure $FP_D$ across said means producing said fuel pressure drop;
 divider means dividing $FP_D$ by $S$;
 comparator means having first and second comparing inputs from said last two mentioned divider means, and having an output;
 solenoid valve means between said fuel supply means and said means producing said fuel pressure drop for controlling the amount of fuel supplied to said last mentioned means, said solenoid valve means being controlled by said output of said comparator means.

21. The invention according to claim 20 wherein:
 said first mentioned divider means comprises:
 first variable resistance chip driver means responsive to said tachometer means;
 first amplifier means responsive to said first chip driver means and to said differential air pressure sensor means;
 said multiplier means comprises:
 second variable resistance chip driver means responsive to said absolute air pressure sensor means;
 second amplifier means responsive to said second chip driver means and to said first amplifier means;

said second mentioned divider means comprises thermistor means connected to the output of said second amplifier means;

said third mentioned divider means comprises:
third variable resistance chip driver means responsive to said tachometer means;
third amplifier means responsive to said third chip driver means and to said differential fuel pressure sensor means.

22. A feedback fuel metering control system for an internal combustion engine, comprising air intake means supplying combustion air to said engine, fuel supply means including a low pressure fuel pump and means metering pumped fuel from said fuel pump to a fuel line supplying fuel to said engine without a carburetor, without a high pressure fuel pump, without high pressure fuel injectors, and without a constant fuel pressure regulator, means sensing the flow velocity of fuel in said fuel line comprising a restriction orifice in said fuel line producing a fuel pressure drop therein, differential fuel pressure sensor means measuring the differential fuel pressure across said orifice indicating fuel flow velocity in said fuel line, means feeding back said indicated fuel flow velocity to said fuel metering means to control the amount of metered pumped fuel in said fuel line, and an air line connected to said fuel line downstream of said restriction orifice.

23. The invention according to claim 22 wherein said engine is a multicylinder engine, and said fuel line has a plurality of braches, each branch having a restriction orifice producing a fuel pressure drop, and each branch having an air line connection downstream of its respective said restriction orifice.

24. The invention according to claim 22 wherein said engine is a two cycle engine, and wherein said low pressure fuel pump is operated by pressure changes in the crankcase of said engine.

25. The invention according to claim 22 wherein said air intake means includes a plenum, and wherein said air line is connected between said plenum and said fuel line downstream of said restriction orifice.

* * * * *

UNITED STATES PATENT AND TRADEMARK OFFICE
CERTIFICATE OF CORRECTION

PATENT NO. : 4,763,626

DATED : August 16, 1988

INVENTOR(S) : RICHARD E. STAERZL

It is certified that error appears in the above-identified patent and that said Letters Patent is hereby corrected as shown below:

Col. 10, line 51, Claim 1, delete second occurence of "of";
Col. 11, line 32, Claim 5, delete "amplifier" and substitute therefor -- amplified --; Col. 13, line 61, Claim 19, delete second occurence of "said" and substitute therefor -- and --;
Col. 16, line 9, Claim 23, delete "braches" and substitute therefor -- branches --.

Signed and Sealed this

Nineteenth Day of September, 1989

Attest:

DONALD J. QUIGG

Attesting Officer

Commissioner of Patents and Trademarks